United States Patent
Woodell

(10) Patent No.: US 7,242,343 B1
(45) Date of Patent: Jul. 10, 2007

(54) DIRECTED SEQUENTIAL HAZARD ASSESSMENT WEATHER RADAR

(75) Inventor: Daniel L. Woodell, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 239 days.

(21) Appl. No.: 10/941,598

(22) Filed: Sep. 15, 2004

(51) Int. Cl.
G01S 13/95 (2006.01)

(52) U.S. Cl. .................................. 342/26 B; 342/26 R

(58) Field of Classification Search ............... 342/26 B
See application file for complete search history.

(56) References Cited

U.S. PATENT DOCUMENTS

| | | | | |
|---|---|---|---|---|
| 4,835,536 A | * | 5/1989 | Piesinger et al. | 342/26 D |
| 5,077,558 A | * | 12/1991 | Kuntman | 342/26 B |
| 5,198,819 A | | 3/1993 | Susnjara | 342/26 |
| 5,311,183 A | * | 5/1994 | Mathews et al. | 342/26 B |
| 5,945,926 A | | 8/1999 | Ammar et al. | 340/970 |
| 6,201,494 B1 | * | 3/2001 | Kronfeld | 342/26 R |
| 6,388,607 B1 | * | 5/2002 | Woodell | 342/26 B |
| 6,388,608 B1 | | 5/2002 | Woodell et al. | |
| 6,424,288 B1 | | 7/2002 | Woodell | |
| 6,456,226 B1 | * | 9/2002 | Zheng et al. | 342/26 R |
| 6,512,476 B1 | | 1/2003 | Woodell | |
| 6,597,305 B2 | | 7/2003 | Szeto et al. | |
| 6,603,425 B1 | | 8/2003 | Woodell | |
| 6,690,317 B2 | * | 2/2004 | Szeto et al. | 342/26 R |
| 6,879,280 B1 | * | 4/2005 | Bull et al. | 342/26 B |
| 6,882,302 B1 | * | 4/2005 | Woodell et al. | 342/26 R |
| 7,042,387 B2 | * | 5/2006 | Ridenour et al. | 342/26 B |
| 2003/0016156 A1 | * | 1/2003 | Szeto et al. | 342/26 |

* cited by examiner

Primary Examiner—Thomas H. Tarcza
Assistant Examiner—Matthew M. Barker
(74) Attorney, Agent, or Firm—Nathan O. Jensen; Kyle Eppele

(57) ABSTRACT

A directed sequential hazard assessment weather radar system detects weather and hazards with low latency and high confidence in a hazard detection mode to detect a region of reflectivity and changes to an assessment mode after detecting the region of reflectivity. The weather radar system scans a volume in front of an aircraft to detect the region of reflectivity in the hazard detection mode using a multiscan process and a reflectivity pulse pattern. The weather radar system determines presence of a hazard in the region of reflectivity after detecting the region. The weather radar system changes to a turbulence pulse pattern in the assessment mode and scans the region of reflectivity with an auxiliary sweep to determine turbulence. The directed sequential hazard assessment weather radar system performs a qualification process by scheduling an additional radar scanning auxiliary sweep to determine if the turbulence is real.

35 Claims, 6 Drawing Sheets in a position corrected memory and reading out the data as
DIRECTED SEQUENTIAL HAZARD ASSESSMENT WEATHER RADAR

BACKGROUND OF THE INVENTION

This invention relates to weather radar and specifically for a weather radar capable of rapid detection and alerting of weather hazards.

Aviation weather hazards include the following: turbulence, hail, lightning, very high precipitation rates, low level windshear, and icing. Some of these hazards may be directly detected while others may be inferred by detecting the type of weather features they are associated with. Turbulence, hail, lightning, and very high rain rates are only associated with convective weather cells. Therefore separating the detection problem into detection of convective weather verses non-convective weather can be very useful. Low-level windshear and icing may be produced by both convective weather as well as other weather types such as stratiform or orthographic weather.

A detectable hazard may be present when the aircraft flight path intersects an area in and around a thunderstorm. Since the aircraft may be flying over a considerable altitude range and the thunderstorm may also exist over both an altitude range and a large extent of sampled azimuth space, the weather radar may be forced to scan over a substantial volume of space. Such volume scans are time consuming and are not compatible with the rapid update requirements needed in a dynamic aircraft environment. This time consuming volume scan generally forces the radar to support both detection and assessment of a hazard with the same sampled data. Therefore the radar may not be optimized for either detection or assessment but supports a compromised data set that provides suboptimal detection and suboptimal assessment.

Some current weather radar systems completely sample a volume of space in front of an aircraft to produce a three-dimensional display. Both horizontal and vertical radar displays are included in these systems. Data that drives the vertical display is built from three-dimensional data sampled from multiple azimuth scans at different antenna beam elevations. With the possible range of heights of weather features and with this data being desired at both moderate and short ranges, the range of vertical elevations that must be sampled produce very long update times. Storing the data in a position corrected memory and reading out the data as needed can improve the apparent latency experienced by the aircrew using this type of radar.

Aircraft heading changes produce new regions of space that must be quickly sampled to produce acceptable display latency. One way to quickly sample the new regions is to scan only those regions of space that are new and not to rescan those regions that have already been scanned. Regions of space that are not scanned are being turned away from. The antenna sweep is slowed in new regions of space that are in front of the aircraft due to the turn to improve estimates of reflectivity and turbulence. This method is disclosed in U.S. Pat. No. 6,512,476 titled "Adaptive Radar Scanning System" by Daniel L. Woodell and assigned to the assignee of the present invention and incorporated herein by reference.

The design of a volume scanning weather radar system is driven by a set of conflicting design goals listed below:

1. Low latency display versus a stable display
2. Low latency display versus a fully sampled volume
3. Ground clutter free display versus detection of all weather
4. Fast antenna sweep speed to support low latency volume detection versus slow sweep speed to dwell on long range targets for long range detection
5. High pulse rates to sample velocities versus low pulse rates to sample long ranges
6. Pulse patterns that reject targets at ambiguous ranges versus pulse patterns that allow the best detections
7. Pulse patterns that minimize clutter contamination versus pulse patterns that support detection of weak returns or the detection of the velocity of returns.

A weather radar design is driven by the multiple tradeoffs of one design goal versus another. The previously described weather radar system in U.S. Pat. No. 6,512,476 trades latency for a full volume sampling process that allows the production of both a horizontal data display and vertical data display from the same three-dimensional data. In some cases, technology may be inserted to allow previously incompatible goals to be met at the same time. Such is the case with a weather radar disclosed in U.S. Pat. No. 6,424,288 "Multi-Sweep Method and System for Detecting and Displaying Weather Information on a Weather Radar System" by Daniel L. Woodell and assigned to the assignee of the present invention and incorporated herein by reference. In U.S. Pat. No. 6,424,288 multiple antenna beams allow antenna tilts optimized for long-range detection to be compatible with production of a ground clutter free display.

What is needed is an alternate mitigation strategy for the volume update problem that inserts new technology to allow timely sampling of both horizontal and vertical weather environments. Such a technology insertion should allow both weather detection and hazard assessment/characterization to be independently optimized.

SUMMARY OF THE INVENTION

A directed sequential hazard assessment weather radar system for detecting and displaying weather and hazards with low latency and high confidence is disclosed. The weather radar system operates in a hazard detection mode to detect a region of reflectivity and changes to an assessment mode after detecting the region of reflectivity to determine presence of a detectable hazard. The weather radar system scans a volume in front of an aircraft using a multiple scan process and uses a reflectivity pulse pattern to detect the region of reflectivity in the hazard detection mode.

The weather radar system changes to the assessment mode after detecting the region of reflectivity to determine if the detectable hazard is the presence of an area of turbulence. The weather radar system in the assessment mode changes to a turbulence pulse pattern and scans the region of reflectivity with an auxiliary sweep to determine the presence of the area of turbulence.

The weather radar system performs a qualification process by scheduling an additional radar scanning auxiliary sweep to determine if the area of turbulence is real. If the area of turbulence has insufficient radar reflectivity to produce a direct turbulence measure a more sensitive reflectivity mode is used to detect the presence of the area of turbulence. If the area of turbulence has insufficient radar reflectivity to produce a direct turbulence measure a second auxiliary sweep is scheduled to detect the area of turbulence. If the area of turbulence has insufficient radar reflectivity to produce a direct turbulence measure, a low antenna tilt angle sample is scheduled to determine if the reflectivity region detected is the top of a thunderstorm whose turbulence is readily detected in a lower wet portion of a weather cell.

The weather radar system in the hazard detection mode detects the reflectivity region that is a thunderstorm cell and changes to the assessment mode with an auxiliary vertical sweep scheduled and optimized for detection of a storm top. A radar pulse pattern used during the vertical sweep is a vertical sweep pulse pattern different from those used for normal reflectivity and turbulence detection.

It is an object of the present invention to provide a sequential hazard assessment weather radar system to produce lower latency radar displays of both reflectivity and turbulence at longer ranges than current weather radars.

It is an object of the present invention to operate a weather radar system in a detection mode normally and an assessment mode only when needed.

It is an object of the present invention to use an optimized reflectivity process in the detection mode and an optimized turbulence process in the assessment mode to detect a turbulence hazard.

It is an advantage of the present invention to use an optimized reflectivity process in detection mode and a situationally optimized radar sample/antenna in the assessment mode to detect a weather hazard.

It is an advantage of the present invention to use an optimized reflectivity process in detection mode and an optimized vertical hail inference process in the assessment mode when needed.

It is an advantage of the present invention to provide a qualification mode to determine if a hazard is real.

It is a feature of the present invention to be able to inset new threat detection and assessment modes as they are needed.

It is feature of the present invention to be able to detect turbulence and storm tops.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a directed sequential hazard assessment weather radar system for detecting weather and hazards with low latency and high confidence. In the directed sequential hazard assessment weather radar system, initial detection of a hazard is separated from assessment of the hazard. The present invention may be used for supporting turbulence detection, storm top detection, hail detection, lighting threat assessment, and all other hazards that are detectable or can have their existence inferred by a weather radar system.

Figure 1:
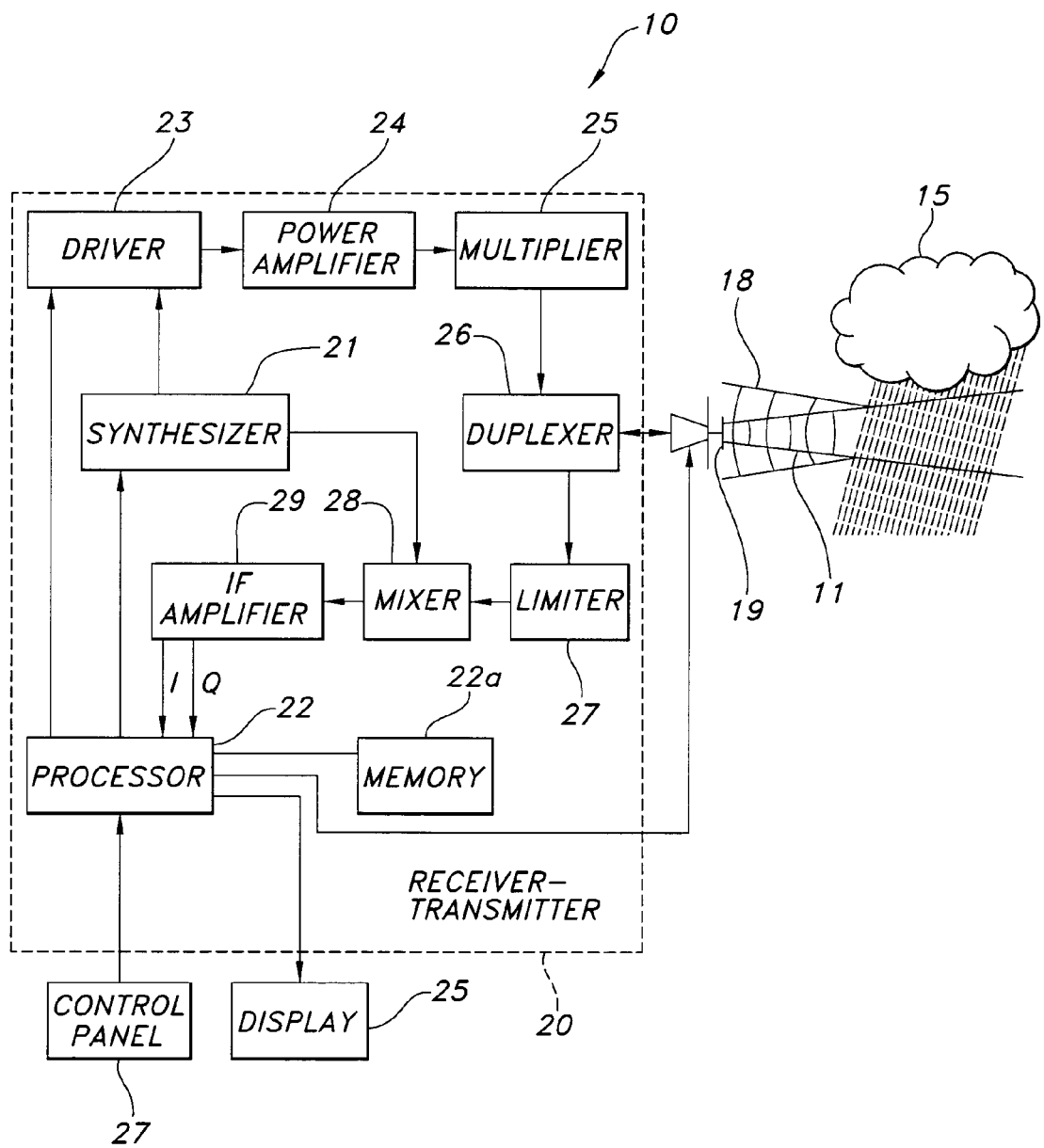
FIG. 1 is a block diagram of an exemplary weather radar system that may incorporate the present invention.

Weather radars are known in the art for detecting severe weather and for providing a flight crew in an aircraft a two-dimensional map display showing range, bearing, and intensity of detected weather patterns. Flight hazards due to weather conditions are primarily the result of precipitation and turbulence. A block diagram of a representative weather radar 10 that may incorporate the present invention for directed sequential hazard assessment is shown in FIG. 1. The weather radar 10 may be a WXR-2100 MULTISCAN Weather Radar System manufactured by Rockwell Collins Inc. and used herein as an exemplary weather radar system to incorporate the present invention.

In FIG. 1 pulses 11 are transmitted from the weather radar system 10 using antenna 19, reflected from a target 15 as return pulses 18 and received by the antenna 19. Within a receiver-transmitter 20 the transmitted pulses 11 are generated using a reference signal from a synthesizer 21. The width and pulse repetition frequency (PRF) of the pulses 11 are generated in a driver 23 and controlled by a processor 22. The pulses 11 are amplified in power amplifier 24 and multiplied to a final transmit frequency in multiplier 25. A duplexer 26 directs the multiplier 25 output to the antenna 19.

The return pulses 18 from the target 15 are passed through the duplexer 26 to a limiter 27 where strong return pulses 18 are attenuated. The output of the limiter 27 is connected to a mixer 28 where the return pulses 18 are down converted in frequency by mixing with an oscillator signal from the synthesizer 21 to produce an intermediate frequency (IF) return signal.

The IF return signal is converted into in-phase (I) and quadrature (Q) components and digitized. The digitized return signals are then processed by the processor 22. The processor 22 uses a series of algorithms to determine the magnitude, spectral width, and velocity gradients of each return pulse 18.

The results of the processed returns are then encoded to a serial data word that is sent to a system display 25. Encoded in the serial data word is the reflectivity data and message information to be displayed to the flight crew.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The amount of energy returned in the return pulses 18 depends on the reflective quality of the target 15. When short pulses strike a target 15 such as precipitation, some of the energy is absorbed, some of it is refracted, and the remainder is reflected. Heavy rainfall produces the strongest reflections; light rainfall, snow, and ice crystal produce weak returns.

The strength of the return pulses 18 is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses when the receiver is listening for return pulses.

The return pulses 18 provide strength information and range to the target 15 such as a thunderstorm in FIG. 1. The range of the target 15 is determined by the amount of elapsed time that occurs between the transmission of a pulse 11 and the reception of the reflected or return pulse 18. The direction or azimuth bearing of the target 15 is determined by noting the azimuth pointing position of the antenna 19. Bearing and range information is then coupled with the reflectivity information and applied to the display 25.

The exemplary WXR-2100 MULTISCAN Weather Radar System is capable of operating in an automatic multiscan mode with processor 22 controlling the weather radar system gain and antenna 19 tilt functions over multiple tilt settings and storing the individual scan data in a memory 22a of the system receiver-transmitter 20. This scan data is continually refreshed and corrected in the memory 22a for aircraft motion by processor 22. The data sent to the system display 25 is a composite of multiple scans that have been processed to remove ground clutter and refine the image. This operation optimizes the display images shown to the flight crew by showing short, mid, and long range weather targets.

In the exemplary weather radar system 10, the total time required to complete one cycle of multiple tilt scans in any of the weather detection modes except windshear is eight seconds. In the windshear mode a complete cycle requires 11.2 seconds. To compensate for aircraft movement during the multiple scans the digital image is translated and rotated in the memory 22a under processor 22 control. This weather radar operation is described in U.S. Pat. No. 6,424,288 previously referenced and U.S. Pat. No. 6,603,425 "Method and System for Suppressing Ground Clutter Returns on an Airborne Weather Radar" by Daniel L. Woodell, assigned to the assignee of the present invention, and incorporated herein by reference.

Figure 2:
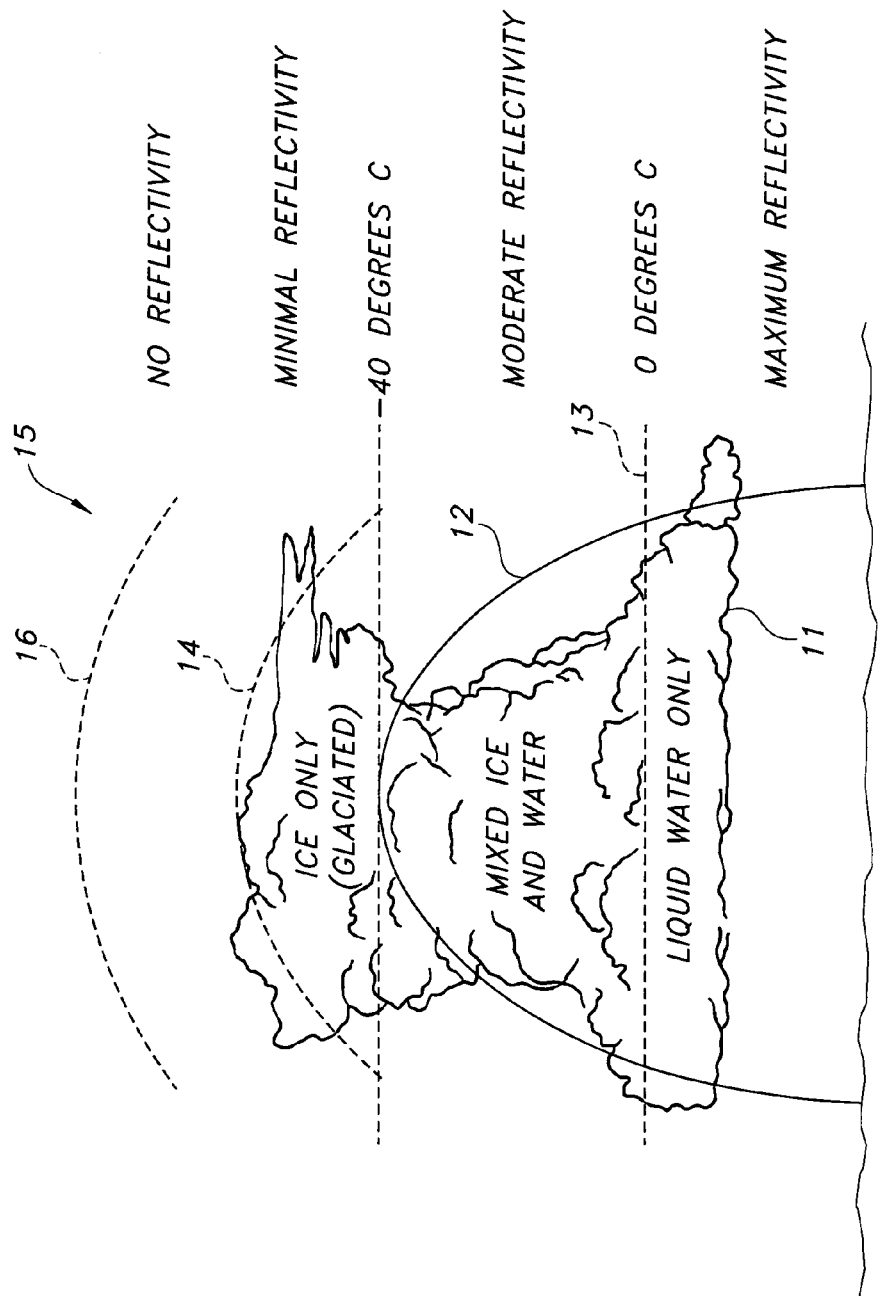
FIG. 2 is a diagram illustrating the geometric distribution of typical thunderstorm.

To understand multiscan operation, it is necessary to understand a typical thunderstorm. FIG. 2 is a diagram illustrating the geometric distribution of typical thunderstorm 15. A portion 11 of thunderstorm 15 at the lowest altitude contains liquid water only. This wet portion 11 has a high level of radar reflectivity. Above a freezing level 13, thunderstorm 15 includes a mixture of ice and water, with moderate radar reflectivity, and a portion of thunderstorm 15 above a temperature level of about −40 degrees C. contains ice only, with relatively low radar reflectivity. Above the ice portion of thunderstorm 15, there is a region 16 with little or no radar reflectivity, where turbulence may exist due to a building thunderstorm 15.

Based on the geometry of thunderstorm 15, regions may be defined by their ability to be detected by radar, their visibility, and their effect on an aircraft. Region 12, which includes the liquid water and the mixed ice and water portions of thunderstorm 15, is a region that is detectable by an aircraft weather radar system, due to the high and moderate radar reflectivity of those portions of the thunderstorm 15. Region 14, which includes the ice portion of thunderstorm 15, is a region that is visible to a pilot but is not normally detectable by radar, due to the low radar reflectivity of the ice portion of thunderstorm 15. Region 16 is not visible or detectable by radar, but is a region of possible high turbulence that can affect the stability of an aircraft passing through.

Since most weather threats are associated with convective weather, the detection of convective weather should be optimized through out such weather's maturity cycle. Optimal convective weather detection samples the region of space at or near the freezing altitude 13 in the atmosphere since detectable reflectivity begins at this altitude and reflectivity is strongest at this altitude for most of a convective weather cell's life cycle.

Figure 3:
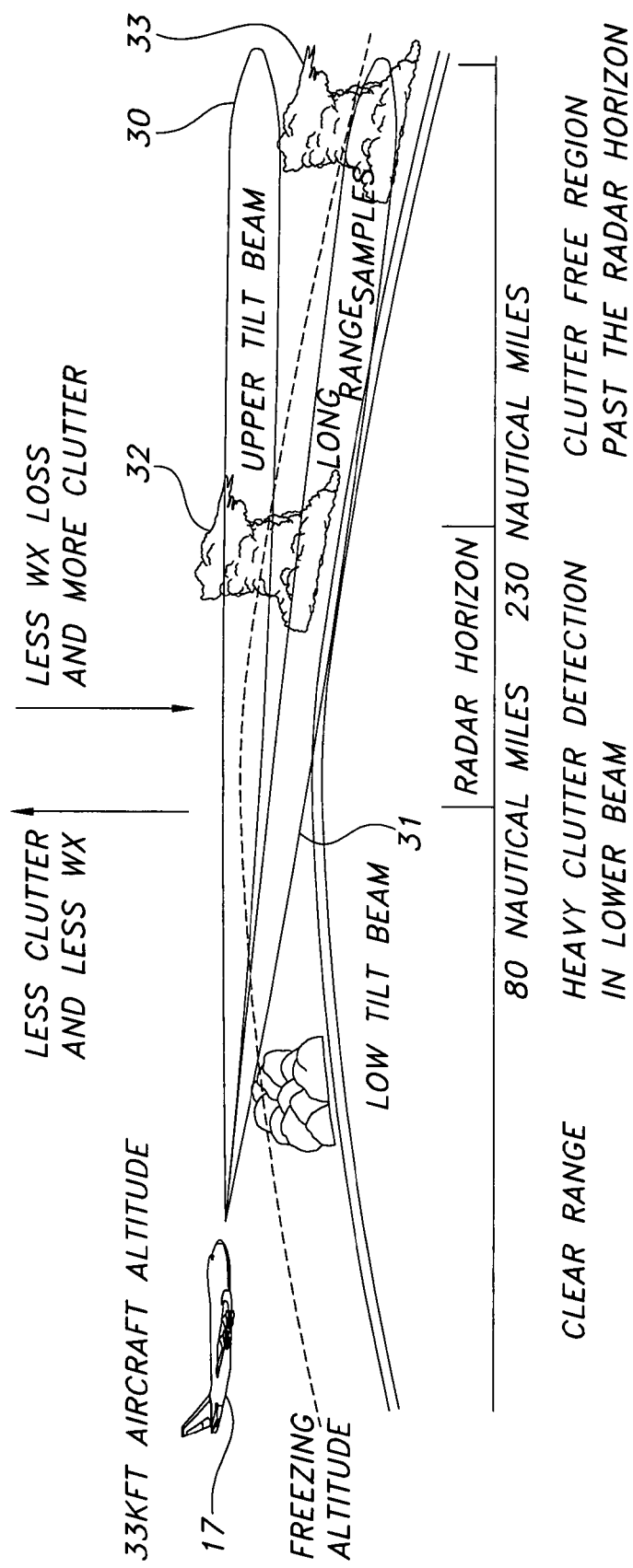
FIG. 3 illustrates multiscan operation of the weather radar system of FIG. 1.

FIG. 3 shows an aircraft 17 flying at 33,000 feet using an upper tilt beam 30 and lower tilt beam 31 to illuminate weather (precipitation) targets 32 and 33. During multiscan operation the receiver-transmitter 20 transmits during the clockwise sweep, a non-windshear pulse pattern at the upper tilt angle, The next sweep the receiver-transmitter 20 transmit the non-windshear pulse pattern at the lower tilt angle. The tilt angles used during multiscan operation are dependent upon aircraft 17 barometric altitude and the terrain height. Reflectivity data is gathered from both tilt scans at four different frequencies using two different pulse widths. The data is placed into memory 22a in memory planes. Each scan generating a short pulse memory plane (0 to 44 nmi) and a long pulse memory plane (0 to 320 nmi). For an upper and lower tilt beam, four memory planes are generated.

The digital processor 22 performs several algorithms that identify ground clutter within the reflectivity using scan-to-scan correlation and beam-to-beam correlation. The data stored in the memory planes is used to support all selected ranges, modes of operation, and selected display options. Transmit pulse widths of 6 and 20 microseconds build 512 sample bins for long range data and 256 sample bins for short range data in the multiscan system.

The memory is geographically aligned in memory planes. The data in each plane is located so that the target data can be correlated between each of the memory planes. The data stored is averaged and filtered with each subsequent scan. The data is continually refreshed and corrected for aircraft motion. All significant weather data is available in the memory planes.

When the data is processed for display, the data from the short range pulses, long range pulses, upper and lower tilt scans is merged, ground clutter eliminated, the flight crew commanded display options are processed and the weather optimized display data is sent to the display 25. The data sent to the display 25 is generated from the four memory planes and not directly related to the antenna scan. The data sampling process has been decoupled from the display 25 process to provide the multiple beam advantage of a merged, optimized display of weather targets from 0 to 320 nmi.

Multiscan is designed for fully automatic operation. For automatic operation the flight crew selects the automatic function, a display mode WX (weather), WX+T (weather plus turbulence), or TURB (turbulence), and a desired range. Once in automatic multiscan mode the processor 22 adjusts antenna 19 tilt and receiver gain to provide an optimum weather display for any range scale. In the WX+T and TURB modes, turbulence is displayed out to 40 nmi for all selected ranges. Because multiscan operation uses multiple scans to detect all significant weather targets, the entire weather picture from 0 to 320 nmi is stored in memory 22a. This includes turbulence data and precipitation velocity variances.

Turbulent areas within a precipitation weather target 15 can be identified by Doppler processing of transmit and receive signals in the weather radar system 10. A turbulent target is a target that exhibits a wide variance in particle velocities. The velocity variance of droplets can be thought of as a spectrum of velocities. The broader the spectrum, the greater the turbulence in the weather target. To provide an accurate spectrum of return signal frequencies, a large number of samples (returns) must be used to produce accurate and reliable results. The threshold of turbulent targets in precipitation exceeds a velocity width of 5 meters/second. This threshold translates into a Doppler frequency shift of 312.5 Hz. For this reason, PRF in the turbulence mode of operation is increased to 1838 pulses/second. With this large number of transmit pulses 11, the receiver-transmitter 20 processes every pulse for precipitation information and provides turbulence data from the spectrum of Doppler shifts caused by precipitation movement. Because of the high PRF rate, the maximum range for turbulence detection is approximately 44 miles. This range limit is established to prevent range ambiguity so subsequent pulsed transmissions do not saturate the receiver.

Once an accurate spectrum of return signals is obtained, the turbulence processor circuits determine if the spectrum represents a spectrum of a turbulent target. The alert threshold for passenger carrying air transport aircraft is approximately 5 to 7.5 meters per second. The five meter per second threshold corresponds to the threshold between light and moderate turbulence that can cause food and beverage spillage or possible minor injury.

The frequency of the return signal is offset from the transmitted frequency because of the Doppler shift caused by the velocity of the aircraft 17 with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out.

The pulse width transmitted is selected based upon the selected range and mode of operation. By using multiple pulse widths, the receiver-transmitter 20 can optimize the operation of the system for a particular range and operation mode. This optimization provides a better resolution in the weather display and efficient use of the transmitted energy. Another factor selected in the receiver-transmitter 20 to optimize performance is the pulse repetition frequency (PRF). PRF optimization is possible with separating detection from assessment. At shorter selected ranges, the receiver portion of the receiver-transmitter 20 is not required to listen for relatively long periods of time. The transmitter is then free to increase the number of transmitted pulses 11. The greater number of transmitted pulses provides more information and a faster update of weather targets present. The PRF may be optimized for detection of a weather pattern and then changed to a PRF optimized for assessment.

Figure 4:
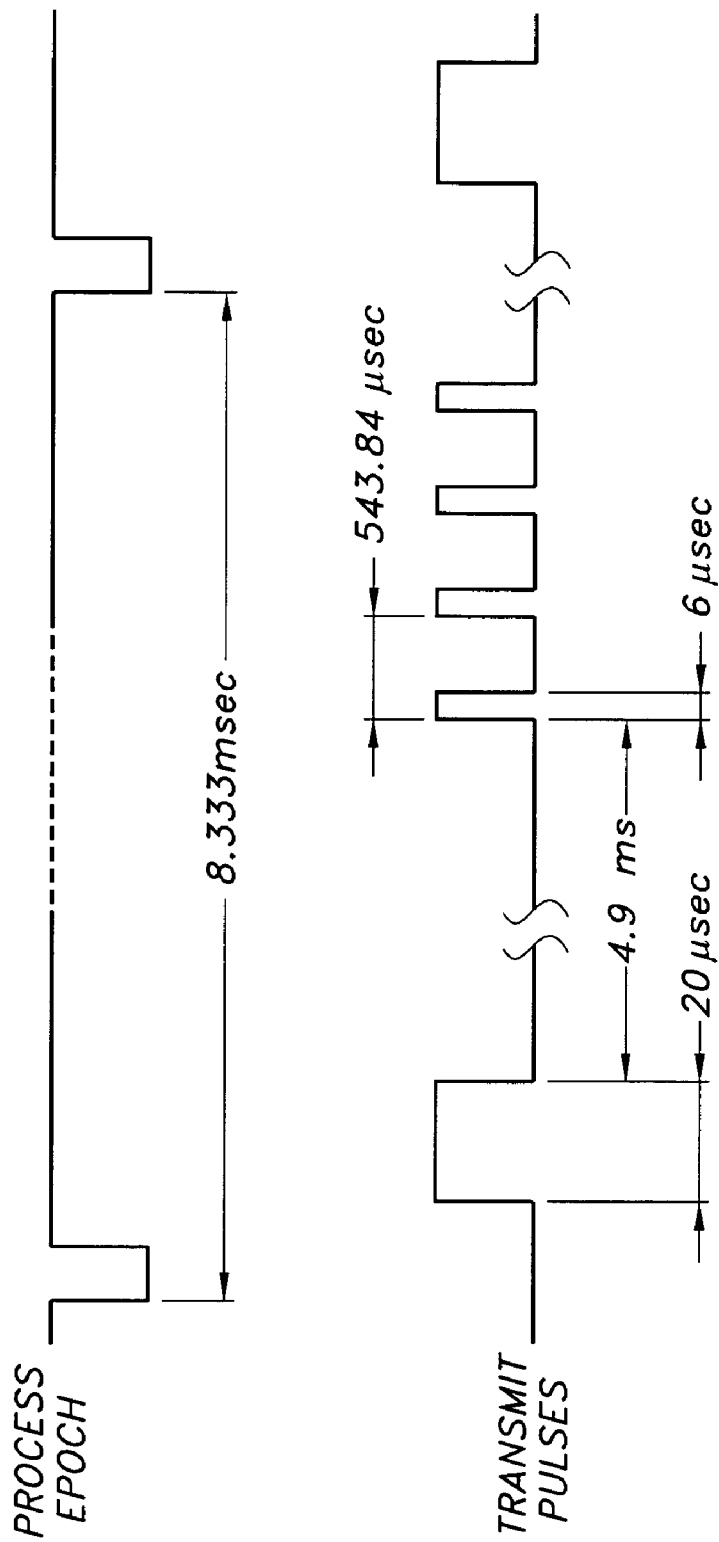
FIG. 4 shows a typical pattern of transmitted pulses for non-windshear operation in the weather radar system of FIG. 1 for a reflectivity mode.

A typical pattern of transmitted pulses 11 for non-windshear operation in the weather radar system 10 is shown in FIG. 4 for the weather mode. For any selected range one 20-microsecond pulse and four 6-microsecond pulses are transmitted during each process epoch of 8.333 milliseconds in this example. After transmitting the 20-microsecond pulse there is a 4.9-millisecond space. This allows returns from targets as far away as 331 nautical miles. A process epoch is the time interval in which a radial of radar data is processed. This time is equal to the size of the radar processing element in degrees divided by the antenna 19 scan rate. This pulse pattern is transmitted at each radial of the antenna 19 scan. The transmitted frequency alternates between four weather transmit channel frequencies. For example, the weather radar system 10 is operating in a weather detection mode and the antenna 19 is scanning clockwise. At the 0-degree radial the transmitter transmits the pulse pattern of FIG. 4 on a first transmit channel frequency of four frequencies. At the completion of that epoch the antenna 19 moves a quarter-degree clockwise and the pulse pattern is transmitted again at one of three remaining frequencies. At the next quarter-degree radial of the antenna 19, the transmit pulse pattern is repeated at one of the remaining two transmit frequencies. The pulse pattern and four frequencies are used for all non-windshear modes of operation such as weather, turbulence, weather plus turbulence, and ground mapping detection.

Figure 5:
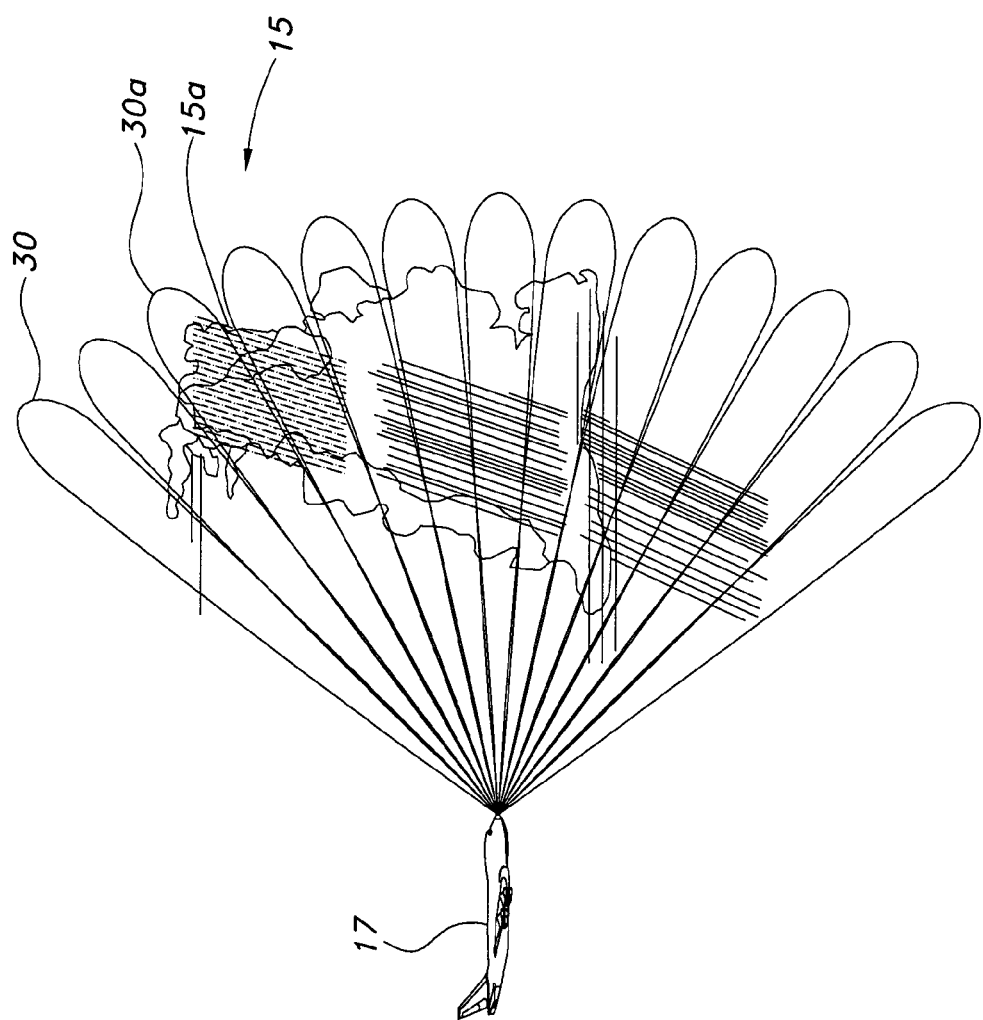
FIG. 5 is a diagram illustrating the weather radar system of FIG. 1 performing a full volumetric scan of a thunderstorm.

FIG. 5 is a diagram illustrating weather radar system 10 performing a volumetric scan on aircraft 17 of the thunderstorm 15. The weather radar system 10 performs 12 scans of a main radar sweep 30 in front of the aircraft 17 at altitudes above, in front of, and below aircraft 17. This volumetric scan may take one minute and may scan only half of the volume in front of the aircraft 17. Main radar sweep 30 detects any weather patterns existing in front of aircraft 17 in its general flight path direction.

The directed sequential hazard assessment system of the present invention, incorporated in the weather radar system 10 of FIG. 1, operates in a hazard detection mode and an assessment mode. The hazard detection mode uses the reflectivity scanning process of the weather detection mode previously described. In the hazard detection mode the weather radar system 10 scans the volume in front of aircraft 17 with main beam 30 as shown in FIG. 5. The weather radar system 10 is capable of scanning the full volume or may scan a portion of the volume in front of the aircraft 17. The weather radar system 10 may use the reflectivity pulse pattern of FIG. 4. The weather radar system 10 may use the multiscan process or any other multiple scan process as previously described. The weather radar system 10 changes to the assessment mode after detecting a region of reflectivity 15a in a thunderstorm 15 to determine the presence of a detectable hazard. The weather radar system 10 in the assessment mode changes to one of several possible situationally dependent pulse patterns or antenna 19 auxiliary movements to determine the presence of a hazard. Examples of these changes are described in the following paragraphs. The weather radar system 10 operation can be optimized for the detection problem independent of needs of assessment.

An additional process of qualification to determine if the hazard is real may be added after the detection and assessment processes. Where false alarm or missed detection producing situations are known, the weather radar system 10 may rescan the region where a possible hazard exits with a qualification pulse pattern and/or antenna movement to deduce whether the hazard is being generated by a known false alarm causing situation or is being missed by the assessment pulse pattern/antenna movement.

As an example of operation of the present invention, a possible turbulence event is detected by radar beam 30a as indicated by a region of reflectivity 15a at some short to moderate range in thunderstorm 15 shown in FIG. 5. Since the estimation of turbulence is a less sensitive process with a higher PRF pulse pattern and shorter range than that of straight reflectivity, a first detection may be done with a simple reflectivity process using a reflectivity pulse pattern in FIG. 4 as previously described. Once the region of reflectivity 15a is identified with beam 30a in FIG. 5, the weather radar system 10 changes its sampling strategy by changing the radar pulse pattern to sample for turbulence in that region of reflectivity 15a as shown in FIG. 6 with an auxiliary or sub-sweep 31.

Figure 6:
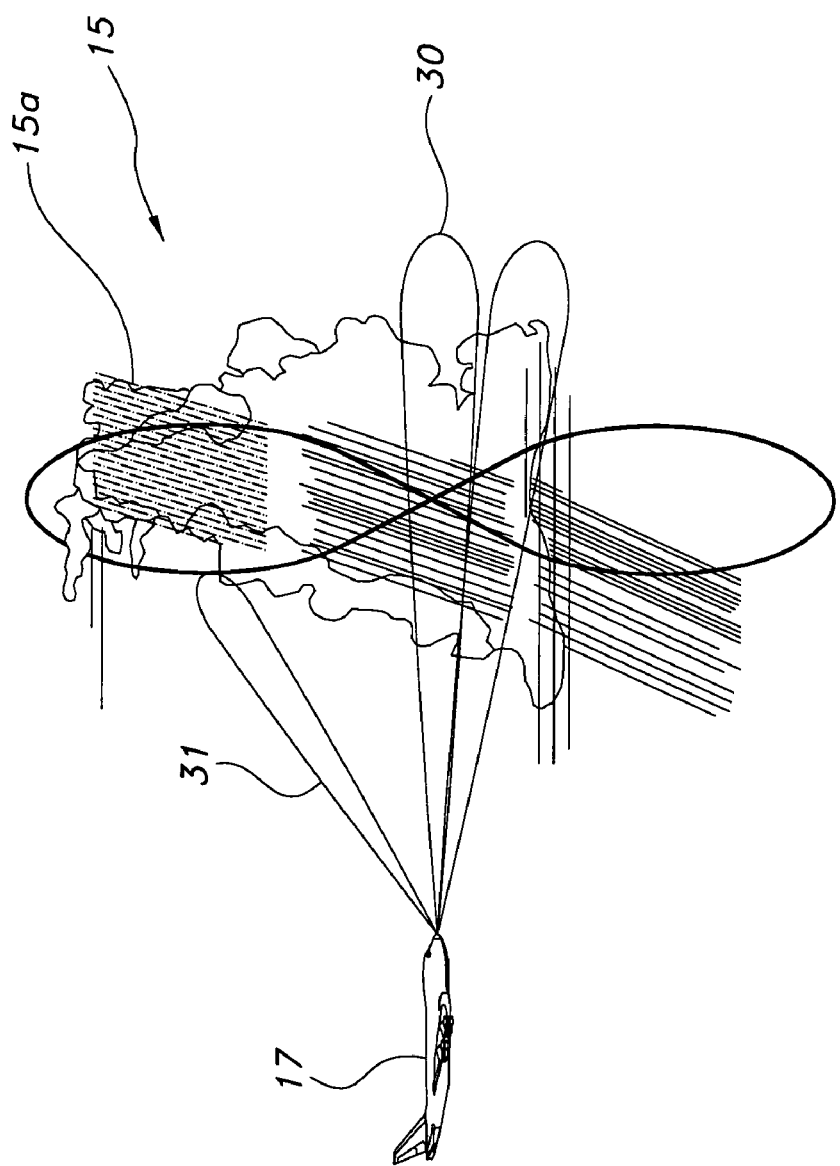
FIG. 6 shows the weather radar system of FIG. 1 changing its sampling strategy to sample for turbulence in a region of reflectivity with an auxiliary or sub-sweep.

Since the region of reflectivity 15a is generally smaller than the entire normally sampled space, the time required sampling turbulence with an auxiliary or sub-sweep 31 in FIG. 6 is much less than the time required sampling the entire environment as shown in FIG. 5. When a radar signature of turbulence is found by the auxiliary sweep 31 in the region of reflectivity 15a a turbulence alert is made.

When the weather radar system 10 changes to the assessment mode to assess whether a detectable hazard is either present or may be likely to be present, the hazard assessment at this point may be either by direct measurement or by inference. An example of a direct measurement is the direct measurement and estimation of either high rain rates or of turbulence. Inference methods include identification of a weather cell being sufficiently convective to produce a lightning or hail hazard.

In either directly measuring a hazard or inferring a hazard, the weather radar system 10 pulse pattern and antenna sweep pattern may be changed over a limited region of sample space to better estimate the hazard. The assessment antenna and pulse patterns may be intermixed with the normal weather detection operations patterns. Since assessment is only used when needed, the amount of volume of space needed to be assessed may be minimized. In addition to the initial hazard assessment, additional assessment methods may be used to reduce possible false detections of hazards by confirming them independently as part of the qualification process.

A determination of whether the detected turbulence in the region of reflectivity 15a is real or spurious is made in the qualification process. The causes of spurious turbulence detections are known. Spurious turbulence detections result from target returns folding in from ambiguous ranges, from targets in sidelobes summing with targets in the desired radar volume, and from bimodal spectra resulting from separated velocity regions in the atmosphere or from weather target velocity verses ground return velocity. Either an additional radar scanning auxiliary sweep can be scheduled or existing data already sampled and stored in memory 22a can be used to determine if the alert is indeed real or driven by an ambiguous range response. In any case, the primary consumer of radar scan time is the normal reflectivity scanning process over a substantial volume in the hazard detection mode performed first in the present invention.

If the area of turbulence has insufficient radar reflectivity to allow the weather radar system 10 to produce a direct turbulence measure, a more sensitive reflectivity mode with a longer transmit pulse to place more energy on target and to lower noise bandwidth may detect the presence of the area of turbulence with radar returns that are thunderstorm-like. Also since the desired range is known, the PRF used may be eclipsed at any other range. The range may be ambiguous. A second auxiliary sweep can be scheduled to try for the measurement of the turbulence signature in the area of turbulence. If this fails because of a low radar return, a low antenna 19 tilt angle sample sweep can be scheduled to identify if the reflectivity region 15a detected is the top of a thunderstorm 15 whose turbulence is readily detected in the lower wet portion 11 of the weather cell. In many cases at cruise in a maritime environment, this detection process may be the only one possible.

Thunderstorm height estimates and in some cases cell structure estimates may be made with a range height indicator. This vertical height examination and estimation can be done with a dense sampling of the environment with the latency problem already described. Instead, assume a normal multiscan-like reflectivity process has identified a region of reflectivity 15a. If this region 15a is a thunderstorm cell-like, an auxiliary vertical sweep or set of sweeps may be scheduled that are optimized for detection of the storm top. A radar pulse pattern used during this vertical sweep is substantially different from those used for either normal reflectivity or turbulence detection.

Hazardous large diameter hail can be differentiated from high rain rate liquid precipitation since large diameter rain drops associated with high rain rates produce larger radar returns for horizontally polarized radar beams than for vertically polarized beams while hail produces similar returns from both horizontal and vertical polarized radars.

Single band radars known as polarimetric radars are generally used for this hail/rain discrimination process with the single antenna 19 switched between the two needed dual polarizations. Regions of weather are examined twice, once with each polarization, and the results compared. The double sampling requirement reduces the rate at which the environment is scanned by 2:1. This leads to undesirable slower update times and reduces the utility of the dual polarization sampling mode.

The sequential hazard assessment weather radar system 10 of the present invention can be used to reduce the sampling time penalty associated with dual antenna 19 polarization hazardous hail/rain discrimination. Only those regions in the weather environment that are likely to produce hail need be examined with the dual polarization mode. The selection of regions for dual polarization examination may be done either on a high radar reflectivity basis or a structural basis. High radar reflectivity is generally associated with hazardous hail. Regions of high reflectivity 15a in FIG. 5 can be identified using a normal single horizontal polarization reflectivity mode previously described and then scheduled for later examination by the dual polarization mode to determine whether hazardous hail is present. On the other hand, once a cell has been identified structural methods may be used to direct the region of dual polarization sampling. An example is a down wind at mid-altitudes from a cell central core.

The same sequential assessment strategy can be used for directing dual-band radars where only one radar band is active at a time. Radars operate at wavelengths where hydrometers scatter microwave energy by Rayleigh scattering. In the Rayleigh region, scattering cross section is inversely proportional to the fourth power of wavelength. Dual radar bands separated by at least a ½ octave allow average hydrometer size to be estimated. Hazardous hail has a greater diameter than 8 mm. Rain drops on the other hand at sizes greater than 8 mm are unstable and generally break-up into smaller drops. Therefore hydrometers that are larger than 8 to 10 mm are generally hail-like. Again if the weather radar system 10 is only capable of operating at one band at a time, sequential assessment may be used to reduce the scan time penalty of using the dual frequency mode.

This concept of sequential assessment of the present invention may be understood with a set of examples of the weather conditions, what is observable during detection, what assessment methods may be used, and what qualification methods may be used. The concept of sequential hazard assessment is not limited to the set of examples given, but is a general concept only illustrated by these specific examples.

In the first example the weather radar system 10 is optimized for long range weather detection in the hazard detection mode but can revert to turbulence assessment in the assessment mode. Long range weather detection performance is a function of the average power the radar system 10 is able to use for the detection. Long transmitter pulses at unambiguous pulse rates are generally used. When a weather cell has been detected and its position and area known, a turbulence assessment may be scheduled. Turbulence detection generally uses a higher pulse rate to sample the velocity spectra unambiguously and a short pulse matched to the length of the scale of turbulence the aircraft is sensitive to. The high pulse rate used for turbulence estimation leads to a short unambiguous range with the possibility of ambiguous range targets folding into the data and producing either under or over estimation of the amount of turbulence in a sampled volume.

In this first example an aircraft 17 is at 33000 feet AGL (above ground level). A first convective weather cell begins at 20 nm from the aircraft 17 and is 3-miles deep at an azimuth range of 0 to 8.6 degrees right of center. A second weather cell begins at 60 nm from the aircraft 17 and is 3-miles deep at an azimuth range of 0 to 3 degrees right of center. The weather radar system 10 uses a long-range pulse set with a sample range 0 to 320 nautical miles. The transmitter pulse length is 30 microseconds and pulse rate is 4 milliseconds resulting in an unambiguous range of greater than 320 nm. The sample rate in range equals 8 microseconds. The antenna 19 elevation is pointed at the radar horizon to maximize detection over the horizon. The cells are detected at both 20 and 60 nautical miles by the weather radar system 10.

The cell at 20 nautical miles is within the range to make a turbulence estimate. While a higher rate pulse pattern is needed, any pattern that folds the responses from the 60 nautical mile cell will contaminate the estimate from the 20 nautical mile cell. The nominal pulse rate will generally be sized to produce the maximum pulse rate while sampling targets to 40 nautical miles. In this case that pulse rate will fold the 60 mile return into the data being generated for the 20 mile cell. Moving the pulse rate to be ambiguous at 36 nautical moves the range at which the 60 mile cell folds to 60−36=24 nautical miles to 63−36=27 nautical miles. A high pulse rate sample set may be commanded for the area in space where the cell was initially detected to estimate the amount of turbulence in the cell, without the interfering return from the 60 nautical mile cell corrupting the estimate. Therefore the assessment mode is both limited in its needed azimuth extent to limit the impact of total radar sample time and adaptive to remove the efforts of a possible interfering weather cell that in a fixed PRF environment will interfere with the estimate of turbulence.

In the second example a weather cell occupies a location in the path of the aircraft 17 a few miles after takeoff. The potential hazard to the aircraft 17 is lightning, turbulence, and high rain rates. A successful detection of the hazard can lead the crew to change departure heading to avoid the hazard. The cell is a decaying isolated thunderstorm. As such, turbulence is not high but the cell is still electrically charged and represents a lightning hazard for any flight path close to the cell. This assessment situation requires two assessment antenna sweeps.

In this second example the aircraft height is 0 feet AGL and the surface temperature is 25 degrees centigrade. The weather cell begins at 20 nm and is 3-miles deep and has a 35-dBz peak reflectivity at 4 degrees right of center. The azimuth range of the cell is 0 to 8.6 degrees right of center and the cell height is 30000 ft with a temperature of −35 degrees centigrade at the top. The weather radar system 10 again uses the long-range pulse set with a sample range of 0 to 320 nautical miles. The transmitter pulse length is 30 microseconds and pulse rate is 4 milliseconds resulting in an unambiguous range of greater than 320 nm. The sample rate in range equals 8 microseconds. The antenna 19 elevation is pointed along the aircraft departure path. The cell is detected at 20 nautical miles with the high loop gain long pulse. High rain rate hazards are estimated with the long pulse pattern.

The cell at 20 nautical miles is within the range to make a direct measurement of the turbulence hazard and a vertical assessment of the weather to determine whether the cell represents a potential lighting risk. A turbulence optimized pulse pattern may be commanded for the azimuth extent of the cell in question to ascertain whether turbulence is present. Without an ambiguous range interference source, the turbulence pulse pattern may be optimized for best estimation of turbulence without other constraints. A first assessment pattern uses a transmitter pulse length of 6 microseconds and a transmitter pulse rate of 370 microseconds (20 nautical mile ambiguous range). The antenna 19 is pointed along the flight path with an azimuth sample of 0 to 8.6 degree right of center.

A vertical second assessment sweep may be commanded to estimate the height/reflectivity profile of the weather cell. Convective weather cells that can generate lightning produce peak reflectivities greater than 30 dBz and have cell heights that exceed the −15 degree centigrade height in the atmosphere. Vertically sampling the weather cell allows the determination of whether the cell is convective or not. The second assessment sweep uses a transmitter pulse length of 6 microseconds and a pulse rate of 370 microseconds (30 nautical mile ambiguous range). The antenna azimuth is 4 degrees right of center and the antenna elevation is pointed along the flight path angle to plus 20 degrees (40000+ft at 20 nm).

Is this case the cell is determined to be convective in nature. A convective cell without large amounts of turbulence is most likely a dissipating mature cell. These cells have historically produced the highest rate of lightning strikes on low altitude aircraft and thus the cell is indicated as a lightning hazard.

In example 3 the conditions are similar to example 2 but in this case the radar system 10 has an antenna 19 that may be switched to either vertical or horizontal polarization. The difference in return levels sampled with vertical verses horizontal polarization may be used to separate high rain rate returns from hail returns. Since samples are required from both polarizations to make a hail determination, the antenna 19 must dwell longer in each elevation/azimuth position reducing the weather update rate available to the aircrew. Thus this mode is very useful but it should only be used only over limited sample extents. Again, in this case a cell occupies a location in the path of the aircraft 17 a few miles after takeoff. The potential hazard to the aircraft 17 is lightning, turbulence, and high rain rates. A successful detection of the hazard can lead the crew to change departure heading to avoid the hazard. The cell is a decaying isolated thunderstorm. As such, turbulence is not high but the cell is still electrically charged and represents a lightning hazard for any flight path close to the cell. This assessment situation requires two assessment antenna sweeps.

In the third example the aircraft height is again 0 feet AGL and the surface temperature is 25 degrees centigrade. The weather cell begins at 20 nm and is 3-miles deep and has a 35-dBz peak reflectivity at 4 degrees right of center. The azimuth range of the cell is 0 to 8.6 degrees right of center and the cell height 30000 ft with a temperature of −35 degrees centigrade at the top. The weather radar system 10 again uses the long-range pulse set with a sample range 0 to 320 nautical miles. The transmitter pulse length is 30 microseconds and pulse rate is 4 milliseconds resulting in an unambiguous range of greater than 320 nm. The sample rate in range equals 8 microseconds. The antenna 19 elevation is such that it is pointed along the aircraft departure path. The cell is detected at 20 nautical miles with the high loop gain long pulse. High rain rate hazards are estimated with the long pulse pattern.

The cell at 20 nautical miles is within the range to make a direct measurement of the turbulence hazard and a vertical assessment of the weather to determine whether the cell represents a potential lighting risk. A turbulence optimized pulse pattern may be commanded for the azimuth extent of the cell in question to ascertain whether turbulence is present. Without an ambiguous range interference source, the turbulence pulse pattern may be optimized for best estimation of turbulence without other constraints. A first assessment pattern is again a transmitter pulse length of 6 microseconds a transmitter pulse rate of 370 microseconds (20 nautical mile ambiguous range). The antenna 19 is pointed along the flight path with an azimuth sample of 0 to 8.6 degree right of center.

A second assessment sweep may be commanded to direct and discriminate hail from rain returns. The second assessment pattern uses a transmitter pulse length of 6 microseconds and a pulse rate 370 microseconds (30 nautical mile ambiguous range). The antenna elevation is along the flight path angle with an extent of azimuth sample 0 to 8.6 degree right of center. This targeted azimuth sweep can be followed by either azimuth sweeps at other beam elevations or by vertical antenna sweeps to further detect possible hail within the detected cell.

In the cases described above using either a change in radar sampling mode or using an auxiliary antenna sweep, detection precedes analysis. However, in all cases auxiliary sampling is described as being scheduled. Scheduling can be done from a risk assessment from the data taken from multiscan-like antenna sweeps. The risk assessment in the auxiliary sampling process is driven primarily from the time to closest approach of the hazard. Hence a cell at five nautical miles is examined before one at 20 nautical miles. Cells along a flight path would be examined before those away from the flight path.

It is believed that the directed sequential hazard assessment weather radar of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A weather radar system on board an aircraft, the weather radar system comprising:
   a transmitter for generating radar pulses in a predetermined pulse pattern in a first mode;
   an antenna system for radiating the radar pulses and scanning over a volume in front of the aircraft in a hazard detection mode and for receiving return pulses from a weather pattern;
   a receiver for receiving the return pulses reflected from the weather pattern;
   a processor for determining a region of reflectivity in the weather pattern associated with the return pulses received by the receiver in the first mode, wherein said processor automatically changes the weather radar system to an assessment mode to determine presence of a detectable hazard after detecting the region of reflectivity, wherein the weather radar system uses a different pulse pattern or scan pattern in the assessment mode from the pulse pattern or scan pattern used in the first mode; and
   a display connected to the processor and for displaying the weather pattern.

2. The weather radar system of claim 1 wherein the volume in front of the aircraft is scanned by the antenna using a multiple scan process controlled by the processor.

3. The weather radar system of claim 1 wherein the predetermined pulse pattern is a reflectivity pulse pattern to determine reflectivity of the weather pattern.

4. A weather radar system on board an aircraft for operation in a hazard detection mode and an assessment mode said weather radar system comprising:
   a transmitter for generating radar pulses in a predetermined pulse pattern;
   an antenna system for radiating the radar pulses and scanning over a volume in front of the aircraft in the hazard detection mode and for receiving return pulses from a weather pattern;
   a receiver for receiving the return pulses reflected from the weather pattern and providing a IF output;
   a processor for determining a region of reflectivity in the weather pattern from the IF output from the receiver wherein said processor changes mode of the weather radar system to the assessment mode to determine presence of a detectable hazard after detecting the region of reflectivity; and
   a display connected to the processor and for displaying the weather pattern, wherein the predetermined pulse pattern changes to a turbulence pulse pattern in the assessment mode and said antenna scans the region of reflectivity with an auxiliary sweep to determine if the detectable hazard includes the presence of an area of turbulence.

5. The weather radar system of claim 4 wherein the processor performs a qualification process to determine if the area of turbulence is real.

6. The weather radar system of claim 4 wherein if the area of turbulence has insufficient radar reflectivity to produce a direct turbulence measure, a more sensitive reflectivity mode is used to detect the presence of the area of turbulence.

7. The weather radar system of claim 4 wherein if the area of turbulence has insufficient radar reflectivity to produce a direct turbulence measure, a second auxiliary sweep is scheduled to detect the area of turbulence.

8. The weather radar system of claim 7 wherein if the area of turbulence has insufficient radar reflectivity to produce a direct turbulence measure, a low antenna tilt angle sample is scheduled to determine if the reflectivity region detected is the top of a thunderstorm whose turbulence is readily detected in a lower wet portion.

9. A weather radar system on board an aircraft for operation in a hazard detection mode and an assessment mode said weather radar system comprising:
   a transmitter for generating radar pulses in a predetermined pulse pattern;
   an antenna for radiating the radar pulses and scanning over a volume in front of the aircraft in the hazard detection mode and for receiving return pulses from a weather pattern;
   a receiver for receiving the return pulses reflected from the weather pattern and providing a IF output;
   a processor for determining a region of reflectivity in the weather pattern from the IF output from the receiver wherein said processor changes mode of the weather radar system to the assessment mode to determine presence of a detectable hazard after detecting the region of reflectivity; and a display connected to the processor and for displaying the weather pattern, wherein the weather radar system in the hazard detection mode detects the region of reflectivity region that is a thunderstorm cell and changes to the assessment mode with an auxiliary vertical sweep scheduled and optimized for detection of a storm top.

10. The weather radar system of claim 9 wherein the predetermined pulse pattern used during the vertical sweep is a vertical sweep pulse pattern different from those used for normal reflectivity and turbulence detection.

11. A weather radar system on board an aircraft for operation in a hazard detection mode and an assessment mode said weather radar system comprising:
a transmitter for generating radar pulses in a predetermined pulse pattern;
an antenna for radiating the radar pulses and scanning over a volume in front of the aircraft in the hazard detection mode and for receiving return pulses from a weather pattern;
a receiver for receiving the return pulses reflected from the weather pattern and providing a IF output;
a processor for determining a region of reflectivity in the weather pattern from the IF output from the receiver wherein said processor changes mode of the weather radar system to the assessment mode to determine presence of a detectable hazard after detecting the region of reflectivity; and
a display connected to the processor and for displaying the weather pattern, wherein in the hazard detection mode the antenna uses a horizontal polarization to detect a region of high radar reflectivity and in the assessment mode the antenna uses a dual polarization to examine the region of high radar reflectivity to determine whether hazardous hail is present.

12. A directed sequential hazard assessment weather radar system for detecting and displaying weather and hazards with low latency and high confidence wherein said weather radar system operates in a hazard detection mode to detect a region of reflectivity and operates in an assessment mode to determine the presence of a detectable hazard after detecting the region of reflectivity, wherein a change to the assessment mode is made by the system in response to detection of the region of reflectivity wherein the assessment mode uses a different pulse pattern or scan pattern from the pulse pattern or scan pattern used in the hazard detection mode.

13. The weather radar system of claim 12 wherein the weather radar system in the hazard detection mode scans a volume in front of an aircraft to detect a region of reflectivity using a multiple scan process.

14. The weather radar system of claim 13 wherein the weather radar system uses a reflectivity pulse pattern to detect the region of reflectivity in the hazard detection mode.

15. The weather radar system of claim 12 wherein the weather radar system changes to the assessment mode after detecting the region of reflectivity to determine if the detectable hazard is the presence of an area of turbulence.

16. A directed sequential hazard assessment weather radar system for detecting and displaying weather and hazards with low latency and high confidence wherein said weather radar system operates in a hazard detection mode to detect a region of reflectivity and changes to an assessment mode to determine the presence of a detectable hazard after detecting the region of reflectivity, wherein the weather radar system in the assessment mode changes to a turbulence pulse pattern and scans the region of reflectivity with an auxiliary sweep to determine the presence of the area of turbulence.

17. The weather radar system of claim 16 wherein the weather radar system performs a qualification process by scheduling an additional auxiliary sweep to determine if the area of turbulence is real.

18. The weather radar system of claim 16 wherein if the area of turbulence has insufficient radar reflectivity to produce a direct turbulence measure a more sensitive reflectivity mode is used to detect the presence of the area of turbulence.

19. The weather radar system of claim 16 wherein if the area of turbulence has insufficient radar reflectivity to produce a direct turbulence measure a second auxiliary sweep is scheduled to detect the area of turbulence.

20. The weather radar system of claim 19 wherein if the area of turbulence has insufficient radar reflectivity to produce a direct turbulence measure, a low antenna tilt angle sample is scheduled to determine if the reflectivity region detected is the top of a thunderstorm whose turbulence is readily detected in a lower wet portion.

21. A directed sequential hazard assessment weather radar system for detecting and displaying weather and hazards with low latency and high confidence wherein said weather radar system operates in a hazard detection mode to detect a region of reflectivity and changes to an assessment mode to determine the presence of a detectable hazard after detecting the region of reflectivity wherein the weather radar system in the hazard detection mode scans a volume in front of an aircraft to detect a region of reflectivity using a multiple scan process, wherein the weather radar system in the hazard detection mode detects the region of reflectivity that is a thunderstorm cell and changes to the assessment mode with an auxiliary vertical sweep scheduled and optimized for detection of a storm top.

22. The weather radar system of claim 21 wherein a radar pulse pattern used during the vertical sweep is a vertical sweep pulse pattern different from those used for normal reflectivity and turbulence detection.

23. A directed sequential hazard assessment weather radar system for detecting and displaying weather and hazards with low latency and high confidence wherein said weather radar system operates in a hazard detection mode to detect a region of reflectivity and operates in an assessment mode to determine the presence of a detectable hazard after detecting the region of reflectivity, wherein the weather radar system in the hazard detection mode uses a horizontal polarization to detect a region of high radar reflectivity and in the assessment mode uses a dual polarization to examine the region of high radar reflectivity to determine whether hazardous hail is present.

24. A method of detecting weather and hazards with low latency and high confidence in a directed sequential hazard assessment weather radar system comprising steps of:
operating in a hazard detection mode to detect a region of reflectivity; and
changing to an assessment mode to determine presence of a detectable hazard after detecting the region of reflectivity, wherein the changing is performed by the system in response to detection of the region of reflectivity, wherein the assessment mode uses a different pulse pattern or scan pattern from the pulse pattern or scan pattern used in the hazard detection mode.

25. The method of detecting weather and hazards with low latency and high confidence in the directed sequential hazard assessment weather radar system of claim 24 further comprising the step of scanning a volume in front of an aircraft to detect a region of reflectivity in the hazard detection mode using a multiple scan process.

26. The method of detecting weather and hazards with low latency and high confidence in the directed sequential hazard assessment weather radar system of claim 24 further comprising the step of utilizing a reflectivity pulse pattern to detect the region of reflectivity in the hazard detection mode.

27. The method of detecting weather and hazards with low latency and high confidence in the directed sequential hard assessment weather radar system of claim 24 further comprising the step of determining if the detectable hazard is the presence of an area of turbulence in the region of reflectivity after detecting the region of reflectivity.

28. The method of detecting weather and hazards with low latency and high confidence in the directed sequential hazard assessment weather radar system of claim 27 further comprising the steps of:

changing to a turbulence pulse pattern in the assessment mode; and scanning the region of reflectivity with an auxiliary sweep to determine the presence of the area of turbulence.

29. The method of detecting weather and hazards with low latency and high confidence in the directed sequential hazard assessment weather radar system of claim 28 further comprising the step of performing a qualification process by scheduling an additional auxiliary sweep to determine if the area of turbulence is real.

30. The method of detecting weather and hazards with low latency and high confidence in the directed sequential hazard assessment weather radar system of claim 27 further comprising the step of selecting a more sensitive reflectivity mode to detect the presence of the area of turbulence if the area of turbulence has insufficient radar reflectivity to produce a direct turbulence measure.

31. The method of detecting weather and hazards with low latency and high confidence in the directed sequential hazard assessment weather radar system of claim 28 further comprising the step of scheduling a second auxiliary sweep to detect the area of turbulence if the area of turbulence has insufficient radar reflectivity to produce a direct turbulence measure.

32. The method of detecting weather and hazards with low latency and high confidence in the directed sequential hazard assessment weather radar system of claim 31 further comprising the step of scheduling a low tilt angle sample to determine if the reflectivity region detected is the top of a thunderstorm whose turbulence by detecting a lower wet portion of a weather cell if the area of turbulence has insufficient radar reflectivity to produce a direct turbulence measure.

33. The method of detecting weather and hazards with low latency and high confidence in the directed sequential hazard assessment weather radar system of claim 25 further comprising the steps of:

detecting the region of reflectivity that is a thunderstorm cell in the hazard detection mode;

changing to the assessment mode; and scheduling an auxiliary vertical sweep optimized for detection of a storm top in the assessment mode.

34. The method of detecting weather and hazards with low latency and high confidence in the directed sequential hazard assessment weather radar system of claim 33 further comprising the step of using a radar pulse pattern that is substantially different from those used for either normal reflectivity or turbulence detection used during the vertical sweep.

35. A method of detecting weather and hazards with low latency and high confidence in a directed sequential hazard assessment weather radar system comprising steps of:

after detecting the region of reflectivity;

detecting a region of high radar reflectivity in the hazard detection mode using a horizontal antenna polarization; and examining the region of high radar reflectivity in the assessment mode using a dual antenna polarization to determine whether hazardous hail is present.

* * * * *